United States Patent
DeLorenzo et al.

(10) Patent No.: US 8,300,813 B1
(45) Date of Patent: Oct. 30, 2012

(54) SECURE INFORMATION TRANSFER BASED ON GLOBAL POSITION

(75) Inventors: David S DeLorenzo, Palo Alto, CA (US); Per K Enge, Mountain View, CA (US); Sherman C. Lo, San Mateo, CA (US)

(73) Assignee: The Boeing Company, Chicago, IL (US)

( * ) Notice: Subject to any disclaimer, the term of this patent is extended or adjusted under 35 U.S.C. 154(b) by 679 days.

(21) Appl. No.: 12/231,094

(22) Filed: Aug. 29, 2008

Related U.S. Application Data

(63) Continuation-in-part of application No. 12/012,327, filed on Feb. 2, 2008.

(51) Int. Cl.
| | |
|---|---|
| *H04K 1/10* | (2006.01) |
| *G01S 19/41* | (2010.01) |
| *G01S 19/38* | (2010.01) |
| *G01S 19/39* | (2010.01) |
| *H04N 1/44* | (2006.01) |
| *H04L 9/00* | (2006.01) |

(52) U.S. Cl. ............ 380/43; 380/35; 380/38; 380/225; 380/239; 380/238; 380/252; 380/254; 380/258; 342/357.22; 342/357.24

(58) Field of Classification Search ............. 380/35, 380/38, 43, 225, 239, 238, 252, 253, 254, 380/258; 342/357.22, 357.24
See application file for complete search history.

(56) References Cited

U.S. PATENT DOCUMENTS

| | | | | |
|---|---|---|---|---|
| 3,656,162 A | * | 4/1972 | Mee | 370/339 |
| 4,382,238 A | * | 5/1983 | Makimoto et al. | 333/134 |
| 4,910,481 A | * | 3/1990 | Sasaki et al. | 333/134 |
| 4,914,699 A | * | 4/1990 | Dunn et al. | 380/34 |
| 4,972,431 A | * | 11/1990 | Keegan | 375/150 |
| 4,972,480 A | * | 11/1990 | Rosen | 380/46 |
| 5,535,278 A | * | 7/1996 | Cahn et al. | 380/274 |
| 5,557,284 A | | 9/1996 | Hartman | |
| 5,589,796 A | * | 12/1996 | Alberth et al. | 330/133 |
| 5,610,984 A | * | 3/1997 | Lennen | 380/270 |
| 5,754,657 A | | 5/1998 | Schipper | |
| 5,757,916 A | | 5/1998 | MacDoran et al. | |
| 5,790,074 A | | 8/1998 | Rangedahl et al. | |
| 5,825,887 A | | 10/1998 | Lennen | |
| 5,955,987 A | | 9/1999 | Murphy et al. | |
| 6,104,815 A | | 8/2000 | Alcon et al. | |
| 6,185,245 B1 | * | 2/2001 | Kim | 375/149 |
| 6,216,007 B1 | | 4/2001 | Havinis et al. | |

(Continued)

OTHER PUBLICATIONS

Kuhn, Markus G. "An Asymmetric Security Mechanism for Navigation Signals", 2004.*

(Continued)

*Primary Examiner* — Michael Simitoski

(74) *Attorney, Agent, or Firm* — Kevin G. Fields; The Boeing Company

(57) ABSTRACT

Secure communication of information is effected from a first party to a second party when the first party knows its own global location and the global location of the second party, and employs what essentially is an undiscoverable code signal that is broadcast to, and received by, both the first and the second parties. The first party securely communicates information to the second party by modifying the code signal with the information that is to be communicated and sends the modified code signal to the second party. Illustratively, the code signal is related to the Y component of a GPS signal.

11 Claims, 2 Drawing Sheets

U.S. PATENT DOCUMENTS

| | | | |
|---|---|---|---|
| 6,317,500 B1 * | 11/2001 | Murphy | 380/258 |
| 6,934,631 B2 | 8/2005 | Dentinger et al. | |
| 7,042,392 B2 | 5/2006 | Whelan et al. | |
| 7,489,926 B2 | 2/2009 | Whelan et al. | |
| 7,609,201 B2 | 10/2009 | Masuda | |
| 7,904,243 B2 | 3/2011 | Cohen et al. | |
| 2002/0017977 A1 | 2/2002 | Wall | |
| 2004/0203868 A1 | 10/2004 | Eidson | |
| 2005/0031051 A1 * | 2/2005 | Rosen et al. | 375/295 |
| 2007/0200756 A1 | 8/2007 | Saito | |

OTHER PUBLICATIONS

Scott, Logan et al. "Location Based Encryption & Its Role in Digital Cinema Distribution", 2003.*

* cited by examiner

SECURE INFORMATION TRANSFER BASED ON GLOBAL POSITION

RELATED APPLICATIONS

This is a continuation in part of U.S. patent application Ser. No. 12/012,327, which was filed on Feb. 2, 2008.

BACKGROUND OF THE INVENTION

When information needs to be communicated in a secure manner one typically turns to cryptographic techniques. It is generally recognized that with many cryptographic techniques the encrypted data can be recovered by an adversary, but only if the adversary has sufficient resources (e.g., computing power) and sufficient time. Most users are satisfied when a method is secure "enough," meaning that the time, effort, or expense to recover the data embedded in an encrypted message is too great to make the data useful to an adversary.

With the above in mind, cryptographic techniques usually depend on encryption and decryption keys being in possession of the communicating parties. Aside from the concern about the inherent security of message encrypted with a particular method, the biggest concern is with the secure creation, distribution and maintenance of the keys.

SUMMARY OF THE INVENTION

An advance in the art is achieved with a method that implements secure transmission of information from one party to another without the need for cryptographic keys but, rather, based on unique geographic attributes such as position as well as time. More specifically, secure communication of information is effected from a first party to a second party when the first party knows its own global location and the global location of the second party, and employs a code signal that is broadcast to, and received by, both the first and the second parties. The first party securely communicates information to the second party by modifying the code signal with the information that is to be communicated and sends the modified code signal to the second party. The code signal that is received by the first party and is used to convey information to the second party need not to be actually known to either of the parties, and from the standpoint of secure communication it is advantageous for the broadcasted code signal (and the corresponding related received signals) to not be known to either of the parties and to be essentially impossible for the parties to discover. The signal that is employed in the disclosed illustrative example is related to the Y component of a GPS signal. Other wireless sources that are modified to include a signal like the Y component of the GPS signal can also be employed.

DETAILED DESCRIPTION

U.S. patent application Ser. No. 12/012,327 discloses an approach whereby a first device, at location x, can verify an assertion by a second device, at location y, as to the global position of the second device. The disclosure presented an illustrative embodiment that is based on the Global Positioning System (GPS) but the principles disclosed therein are broader and are not limited to the GPS. For examples, they can be readily applied to the other global navigation satellite systems being developed and deployed worldwide.

To assist the reader in understanding the instant invention without having to read the aforementioned application, the following repeats a significant portion of the mathematical underpinnings presented in the 12/012,327 application. It should be kept in mind that here, as well, the principles of the disclosed invention are broader than the illustrative example that uses the GPS.

Figure 1:
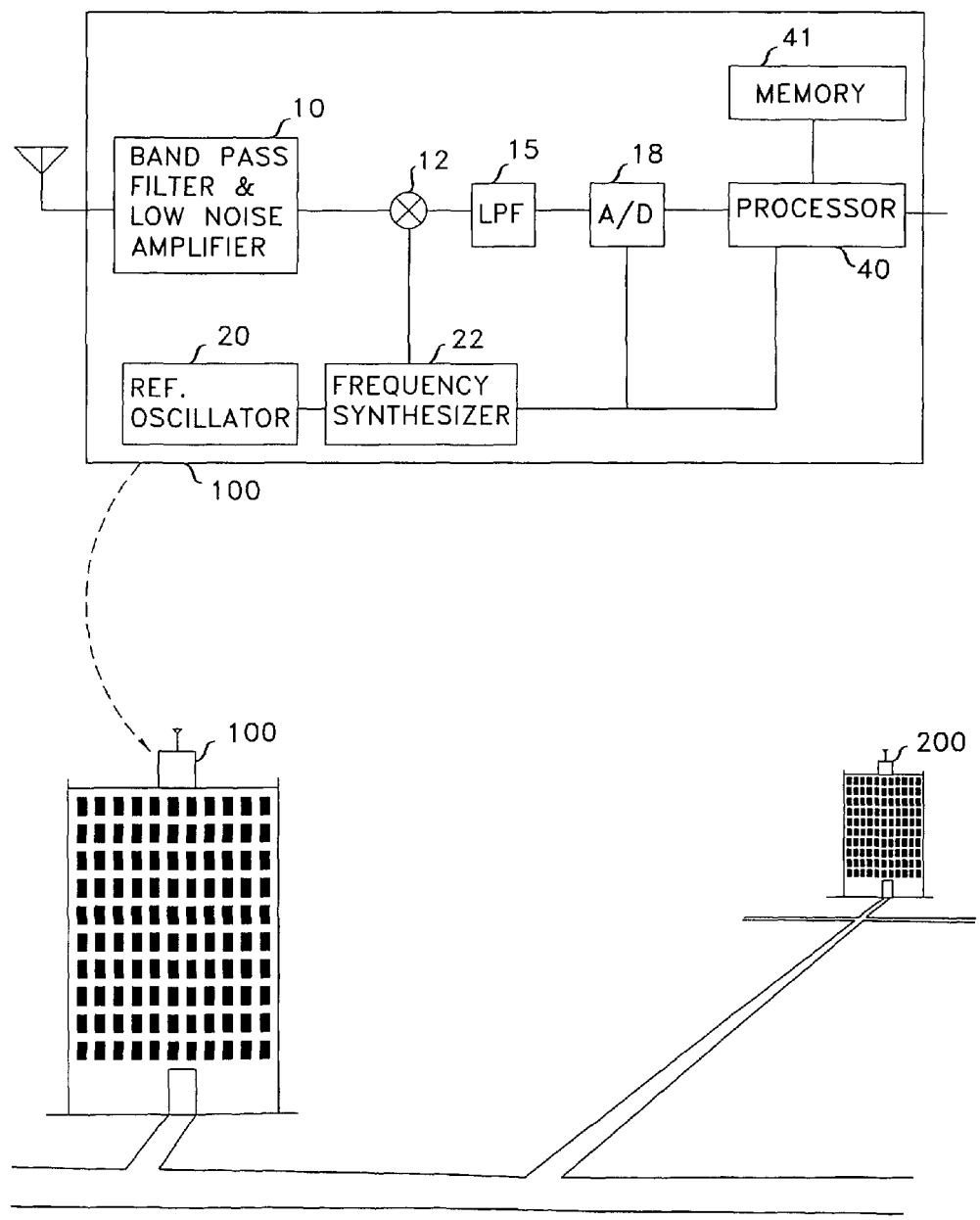
FIG. 1 depicts a first unit that securely transmits information without the use of cryptographic keys.

FIG. 1 shows unit 100 that belongs to Remote Device B, which simultaneously receives a number of GPS satellite signals on frequency L1, where the signal transmitted by satellite n can be expressed as $$S_{transmitted}^{n} = A^{n}D^{n}(t)x_{C}^{n}(t)\cos(2\pi(f_{L1})t+\phi_{1}) + B^{n}D^{n}(t)x_{Y}^{n}(t)\sin(2\pi(f_{L1})t+\phi_{1}) \quad (1)$$

where $D^{n}(t)$ is the data signal of satellite n, $x_{C}^{n}(t)$ is a code signal assigned to satellite n that is publicly known, $x_{Y}^{n}(t)$ is a code signal assigned to satellite n that is not publicly known, $f_{L1}$ is the frequency of the carrier, and $\phi_{1}$ is the phase of the carrier relative to the beginning of the data and code signals. Unit 100 is the party that wishes to send information to a remote unit 200 without the use of cryptographic keys.

A GPS receiver receives a signal corresponding to the sum of the signals of the individual satellites. The receiver can engage in the processing of signals as if all of the possible satellites are present but, of course, some of the satellites are not within range of the GPS receiver's antenna (i.e., not detectible) so the processing results for those satellites are not viable. In other words, the signal arriving at the FIG. 1 antenna corresponds to $$\sum_{n=1}^{K}[A''D''(t)x_{C}''(t)\cos(2\pi(f_{L1})t+\varphi_{1}) + B''D''(t)x_{Y}''(t)\sin(2\pi(f_{L1})t+\varphi_{1})] + \text{Noise} \quad (1a)$$

where K is the number of satellites that are within view of the antenna.

The following analysis follows the signal of only one satellite and, for sake of simplicity superscript n is omitted from the equations. The fact that other satellite signals exist is addressed later.

The transmitted signal is subjected to transit time delay before reaching the receiver, and the signal that is received by a first receiver's antenna experiences a Doppler frequency shift, $f_D$, due to the satellite's movement in its orbit and possible receiver motion. Also, the transmitter and the receiver do not have a common clock, which means that even when the transmitter and the receiver clocks are at identical frequency, there is a phase difference between them. To make the equations more general, one might assume that there is a time shift (the transitions are not fully aligned) between the $AD(t)x_C(t)$ and the $BD(t)x_Y(t)$, so the signal received at the first receiver can be expressed as $$S_{received,1} = A_1 D(t-\tau_{C,1})x_C(t-\tau_{C,1})\cos(2\pi(f_{L1}+f_{D,1})(t-\tau_1)+\phi_{1,1}) + B_1 D(t-\tau_{Y,1})x_Y(t-\tau_{Y,1})\sin(2\pi(f_{L1}+f_{D,1})(t-\tau_1)+\phi_{1,1}) \quad (2)$$

or simplified to $$S_{received,1} = A_1 D(t-\tau_{C,1})x_C(t-\tau_{C,1})\cos(2\pi(f_{L1}+f_{D,1})t+\phi_{1,1}-\phi_{2,1}) + B_1 D(t-\tau_{Y,1})x_Y(t-\tau_{Y,1})\sin(2\pi(f_{L1}+f_{D,1})t+\phi_{1,1}-\phi_{2,1}) \quad (3)$$

It may be noted that for GPS, the C/A code and Y code are aligned, so this generalization is not needed for a GPS-based embodiment.

As shown in FIG. 1, the received signal is detected and amplified in element 10, conventionally downshifted in element 12 to a preselected intermediate frequency (IF) by multiplying the received signal by signal $$\sin(2\pi(f_{L1}-f_{IF})t+\phi_{3,1}) \quad (4)$$

and low pass filtered by element 15. The signal of equation (4) is generated from reference oscillator 20 by frequency synthesizer 22, where $\phi_3$ is the phase of the locally generated signal (relative to the beginning of the data and code signals at the transmitting satellite which, of course, is unknown). The result at the output of the low pass filter is $$S_{downshifted,1}=A_1D(t-\tau_{C,1})x_C(t-\tau_{C,1})\cos(2\pi(f_{IF}+f_{D,1})t+\phi_{1,1}-\phi_{2,1}-\phi_{3,1})+B_1D(t-\tau_{Y,1})x_Y(t-\tau_{Y,1})\sin(2\pi(f_{IF}+f_{D,1})t+\phi_{1,1}-\phi_{2,1}-\phi_{3,1}) \quad (5)$$

or simplified to $$S_{downshifted,1}=A_1D(t-\tau_{C,1})x_C(t-\tau_{C,1})\cos(2\pi(f_{IF}+f_{D,1})t+\theta_1)+B_1D(t-\tau_{Y,1})x_Y(t-\tau_{Y,1})\sin(2\pi(f_{IF}+f_{D,1})t+\theta_1). \quad (6)$$

It may be noted that the above-described use of downshifting by use of an IF modulator and low pass filter is illustrative, and that the A/D can be connected directly to the amplifier, and controlled to generate a digital signal as if it were downshifted as shown in FIG. 1.

As depicted, the output signal of the low pass filter is digitized in A/D converter 18 and applied to a combination of processor 40 and associated memory 41, where the remainder of the processing takes place.

Figure 2:
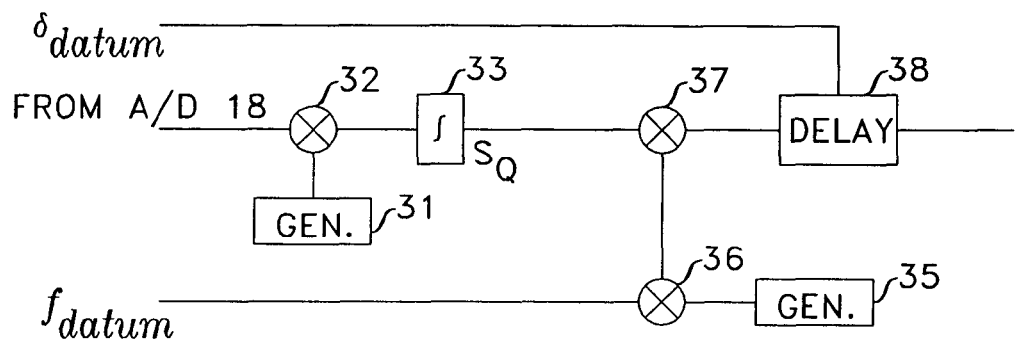
FIG. 2 shows some of the processing within processor 40 of FIG. 1.

The processing in accord with the instant disclosure, shown in FIG. 2, begins with a carrier generator module 31 creating the signal $$\cos(2\pi(f_{IF}+\hat{f}_D)t+\hat{\theta}_1)-i\sin(2\pi(f_{IF}+\hat{f}_D)t+\hat{\theta}_1), \quad (7)$$

where $\hat{f}_D$ is an estimate of the Doppler frequency shift $f_D$, and $\hat{\theta}_1$ is an estimate of the phase $\theta_1$. To be clear, the Doppler frequency shift and the phase estimates are estimates for a particular satellite. Multiplying the received (and downshifted) signal of equation (6) by the phasor of equation (7) in element 32 yields $$A_1D(t-\tau_{C,1})x_C(t-\tau_{C,1})\begin{Bmatrix}+\cos(2\pi(f_{D,1}-\hat{f}_{D,1})t+\theta_1-\hat{\theta}_1)\\+i\sin(2\pi(f_{D,1}-\hat{f}_{D,1})t+\theta_1-\hat{\theta}_1)\end{Bmatrix}+ \quad (8)$$

$$B_1D(t-\tau_{Y,1})x_Y(t-\tau_{Y,1})\begin{Bmatrix}+\sin(2\pi(f_{D,1}-\hat{f}_{D,1})t+\theta_1-\hat{\theta}_1)\\-i\cos(2\pi(f_{D,1}-\hat{f}_{D,1})t+\theta_1-\hat{\theta}_1)\end{Bmatrix}$$

which can be viewed as a real or inphase component (which is not shown in FIG. 2)

$$S_{L1}=A_1D(t-\tau_{C,1})x_C(t-\tau_{C,1})\{+\cos(2\pi(f_{D,1}-\hat{f}_{D,1})t+\theta_1-\hat{\theta}_1)\}+B_1D(t-\tau_{Y,1})x_Y(t-\tau_{Y,1})\{+\sin(2\pi(f_{D,1}-\hat{f}_{D,1})t+\theta_1-\hat{\theta}_1)\} \quad (9)$$

and a quadrature component (which is shown in FIG. 2)

$$S_{Q,1}=A_1D(t-\tau_{C,1})x_C(t-\tau_{C,1})\{\sin(2\pi(f_{D,1}-\hat{f}_{D,1})t+\theta_1-\hat{\theta}_1)\}-B_1D(t-\tau_{Y,1})x_Y(t-\tau_{Y,1})\{\cos(2\pi(f_{D,1}-\hat{f}_{D,1})t+\theta_1-\hat{\theta}_1)\}. \quad (10)$$

Integrating this signal in element 33 over a preselected interval that is long enough to filter out the 2 $f_{IF}$ signal component yields $$\int A_1D(t-\tau_{C,1})x_C(t-\tau_{C,1}) \quad (11)$$

$$\begin{Bmatrix}\cos(2\pi(f_{IF}+\hat{f}_{D,1})t+\hat{\theta}_1)\cos(2\pi(f_{IF}+f_{D,1})t+\theta_1)\\-i\sin(2\pi(f_{IF}+\hat{f}_{D,1})t+\hat{\theta}_1)\cos(2\pi(f_{IF}+f_{D,1})t+\theta_1)\end{Bmatrix}+$$

$$\int B_1D(t-\tau_{Y,1})x_Y(t-\tau_{Y,1})$$

$$\begin{Bmatrix}\cos(2\pi(f_{IF}+\hat{f}_{D,1})t+\hat{\theta}_1)\sin(2\pi(f_{IF}+f_{D,1})t+\theta_1)\\-i\sin(2\pi(f_{IF}+\hat{f}_{D,1})t+\hat{\theta}_1)\sin(2\pi(f_{IF}+f_{D,1})t+\theta_1)\end{Bmatrix}$$

which can be written as $$\int A_1D(t-\tau_{C,1})x_C(t-\tau_{C,1}) \quad (12)$$

$$\begin{Bmatrix}\cos(2\pi(2f_{IF}+f_{D,1}+\hat{f}_{D,1})t+\theta_1+\hat{\theta}_1)\\+\cos(2\pi(f_{D,1}-\hat{f}_{D,1})t+\theta_1-\hat{\theta}_1)\\-i\sin(2\pi(2f_{IF}+f_{D,1}+\hat{f}_{D,1})t+\theta_1+\hat{\theta}_1)\\+i\sin(2\pi(f_{D,1}-\hat{f}_{D,1})t+\theta_1-\hat{\theta}_1)\end{Bmatrix}+\int B_1D(t-\tau_{Y,1})$$

$$x_Y(t-\tau_{Y,1})\begin{Bmatrix}\sin(2\pi(2f_{IF}+f_{D,1}+\hat{f}_{D,1})t+\theta_1+\hat{\theta}_1)\\+\sin(2\pi(f_{D,1}-\hat{f}_{D,1})t+\theta_1-\hat{\theta}_1)\\+i\cos(2\pi(2f_{IF}+f_{D,1}+\hat{f}_{D,1})t+\theta_1+\hat{\theta}_1)\\-i\cos(2\pi(f_{D,1}-\hat{f}_{D,1})t+\theta_1-\hat{\theta}_1)\end{Bmatrix}.$$

In accord with one implementation of the principles disclosed herein, unit 100 knows its own global position and it also knows the global position of a particular remote unit 200. Illustratively, unit 100 is situated on the roof of a corporate headquarters building in one city, and unit 200 is situated on the roof of a corporate building in another city. If unit 100 does not know the location of unit 200, it may obtain it from unit 200 and verify that the location is bona fide in the manner disclosed in the parent application identified above. Armed with this knowledge, unit 100 is able to send information to unit 200 by generating and processing a signal that is a close facsimile of the signal that unit 100 knows is received by unit 200. Specifically, unit 100 may modulate its signal with a time delay (delay-based encoding), a frequency shift (frequency-based encoding), or both, in order to effect secure information transmittal to unit 200. To realize frequency-based encoding, unit 100 may proceed as follows: from readily available information, unit 100 obtains a fairly good estimate of the Doppler frequency shift, $\hat{f}_{D,2}$, of the signal arriving at the unit 200 location from a particular satellite (which is a fairly good estimate), generates a reference signal with this frequency in element 35, frequency shifts that signal by a chosen frequency value, $f_{datum}$ in element 36, to obtain a frequency $\hat{f}_{D,2}$ (i.e., $\hat{f}_{D,2}=\hat{f}_{D,2}+f_{datum}$), and thus creates the signal $$\cos[2\pi(f_{IF}+\hat{f}_{D,2})(t)+\hat{\theta}_2]-i\sin[2\pi(f_{IF}+\hat{f}_{D,2})(t)+\hat{\theta}_2] \quad (13)$$

that is applied to element 37. To realize delay-based encoding, unit 100 may proceed as follows: element 37 multiplies the signal of equation (13) by the quadrature signal of equation (12), delays it by $\delta_{datum}$ in element 38, and outputs the signal $$s_{Q,1,2,\delta} = \left\{ \begin{array}{l} A_1 D(t-\tau_{C,1}-\delta_{datum}) x_C(t-\tau_{C,1}-\delta_{datum}) \sin \\ \quad [2\pi(f_{D,1}-\hat{f}_{D,1})(t-\delta_{datum})+\theta_1-\hat{\theta}_1] \\ -B_1 D(t-\tau_{Y,1}-\delta_{datum}) x_Y(t-\tau_{Y,1}-\delta_{datum}) \cos \\ \quad [2\pi(f_{D,1}-\hat{f}_{D,1})(t-\delta_{datum})+\theta_1-\hat{\theta}_1] \end{array} \right\} \times \qquad (14)$$

$$2 \left\{ \begin{array}{l} \cos[2\pi(f_{IF}+\hat{f}_{D,2}[[\tilde{f}_{D,2}]])(t-\delta_{datum})+\hat{\theta}_2] \\ -i\sin[2\pi(f_{IF}+\hat{f}_{D,2}[[\tilde{f}_{D,2}]])(t-\delta_{datum})+\hat{\theta}_2] \end{array} \right\}$$

which can be expressed more compactly as $$s_{Q,1,2,\delta} = \left\{ \begin{array}{l} A_1 D(t-\tau_{C,1}-\delta_{datum}) x_C(t-\tau_{C,1}-\delta_{datum}) \sin(\alpha) \\ -B_1 D(t-\tau_{Y,1}-\delta_{datum}) x_Y(t-\tau_{Y,1}-\delta_{datum}) \cos(\alpha) \end{array} \right\} \times \qquad (15)$$

$$2\{\cos(\beta) - i\sin(\beta)\}$$

where
$\alpha = 2\pi(f_{D,1}-\hat{f}_{D,1})(t-\delta_{datum})+\theta_1-\hat{\theta}_1$
and $\beta = 2\pi(f_{IF}+\tilde{f}_{D,2})(t-\delta_{datum})+\hat{\theta}_2$.

It might be remembered that the analysis above focuses on the signal of one satellite while recognizing that signals from a number of satellites are concurrently processed, and it also should be remembered that the signal of equation (13) that is created within unit 100 pertains, relative to the Doppler shift and delay, to a single satellite that is chosen by unit 100. Thus, it should be realized that the equation (15) signal is really a sum of signals of the form found within the brackets {•} that are all multiplied by the $2\{\cos(\beta)-i\sin(\beta)\}$ term that is adjusted to parameters for the one chosen satellite; to wit, the output signal of unit 100, $S_{100}$, is $$s_{100} = 2\{\cos(\beta)-i\sin(\beta)\} \qquad (15a)$$

$$\sum_{n=1}^{K} \left\{ \begin{array}{l} A_1'' D''(t-\tau_{C,1}-\delta_{datum}) x_C^n(t-\tau_{C,1}-\delta_{datum}) \sin(\alpha_i) \\ -B_1'' D''(t-\tau_{Y,1}-\delta_{datum}) x_Y^n(t-\tau_{Y,1}-\delta_{datum}) \cos(\alpha_i) \end{array} \right\}$$

where
$\alpha_i = 2\pi(f_{D,1}^{(i)}-\hat{f}_{D,1})(t-\delta_{datum})+\theta_1^{(i)}-\hat{\theta}_1$
$f_{D,1}^{(i)}$ is the Doppler of satellite i as measured at unit 100
$\theta_1^{(i)}$ is the phase shift of the signal from satellite i as measured at unit 100.

Unit 100 sends the signal of equation (15a) to unit 200, which also receives its own GPS signal, $s_2$. Within unit 200 signal $s_2$ is downshifted to develop the signal $$s_2 \cdot s_{mix,2} = A_2 D(t-\tau_{C,2}) x_C(t-\tau_{C,2}) \cos[2\pi(f_{IF}+f_{D,2})t+\theta'_2] + B_2 D(t-\tau_{Y,2}) x_P(t-\tau_{Y,2}) \sin[2\pi(f_{IF}+f_{D,2})t+\theta'_2], \qquad (16)$$

where $\tau_{c,2}, \tau_{c,2}$ and $f_{D,2}$ are the delays and Doppler frequency shift experienced by the signal that reaches unit 200. It is noted that in a conventional manner the Doppler frequency $f_{D,2}$ may be determined, for example by tracking in a frequency-lock or phase-lock loop.

Figure 3:
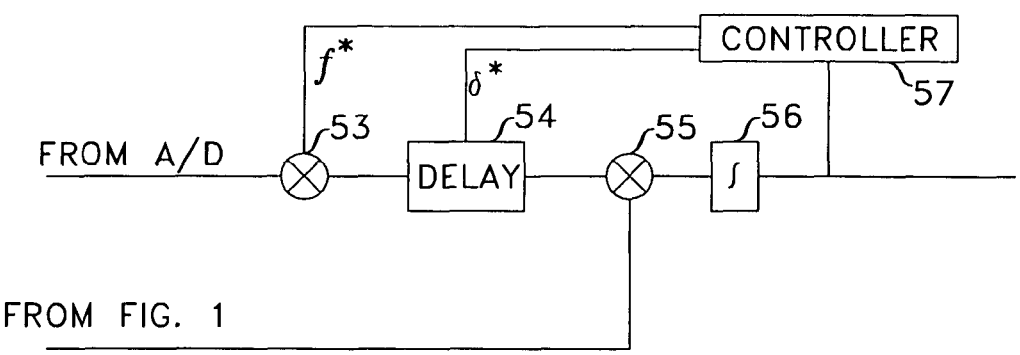
FIG. 3 depicts some of the processing within a unit that receives the signal transmitted by the FIG. 1 unit.

In accord with one embodiment of the principles disclosed herein and depicted in FIG. 3, unit 200 receives a signal by means of elements that correspond to elements 10, 12, 15, 18, 20 and 22 of FIG. 1, but which are not shown in FIG. 2 for sake of clarity, and within the processor of unit 200 (which corresponds to processor 40 of FIG. 1) performs what effectively is a two-dimensional correlation between the signal received from the satellites and the signal received from unit 100, by shifting the signal received from the satellites (i.e., the signal of equation (16)) by f* in element 53, delaying the shifted signal by δ* in element 54, multiplying the output of element 54 by the signal received from unit 100 (i.e., the signal of equation (15) in element 55), integrating in element 56, and repeating the process with different values of f* and δ* to find a peak, all under management of controller 57.

The frequency shifting and the time delaying of the equation (16) signal yields $$s_{2,\delta} = A_2 D(t-\tau_{C,2}-\delta^*) x_C(t-\tau_{C,2}-\delta^*) \cos[2\pi(f_{IF}+\tilde{f}_{D,2})(t-\delta^*)+\theta'_2] + B_2 D(t-\tau_{Y,2}-\delta^*) x_P(t-\tau_{Y,2}-\delta^*) \sin[2\pi(f_{IF}+\tilde{f}_{D,2})(t-\delta^*)+\theta'_2] \qquad (17)$$

where $\tilde{f}_{D,2} = f_{D,2} + f^*$. Labeling $2\pi(f_{IF}+\tilde{f}_{D,2})(t-\delta^*)+\theta'_2$ as γ yields $$s_{2,\delta^*} = A_2 D(t-\tau_{C,2}-\delta^*) x_C(t-\tau_{C,2}-\delta^*) \cos(\gamma) + B_2 D(t-\tau_{Y,2}-\delta^*) x_P(t-\tau_{Y,2}-\delta^*) \sin(\gamma). \qquad (18)$$

The multiplication of the equation (18) signal by the signal of equation (15) yields $$s_{Q,1,2,\delta} \cdot s_{2,\delta} = \left\{ \begin{array}{l} A_1 D(t-\tau_{C,1}-\delta) x_C(t-\tau_{C,1}\delta) \sin(\alpha) \\ -B_1 D(t-\tau_{Y,1}-\delta) x_P(t-\tau_{Y,1}-\delta) \cos(\alpha) \end{array} \right\} \times 2 \qquad (19)$$

$$\{\cos(\beta) - i\sin(\beta)\} \times \left\{ \begin{array}{l} A_2 D(t-\tau_{C,2}-\delta^*) x_C(t-\tau_{C,1}\delta^*) \sin(\gamma) \\ +B_2 D(t-\tau_{Y,2}-\delta^*) x_P(t-\tau_{Y,1}-\delta^*) \cos(\gamma) \end{array} \right\}.$$

Carrying out the multiplication, grouping terms, and dropping the terms involving $\cos(\gamma+\beta)$ and $\sin(\gamma+\beta)$ because subsequent integration acts as low pass filtering, yields $$S_{Q,1,2,\delta} \cdot S_{2,\delta^*} = (U-V) \times (W+iX+Y-iZ) \qquad (20)$$
$$= \{UW + iUX + UY - iUZ - VW - iVX - VY + iVZ\}$$

where $$U = A_1 D(t-\tau_{C,1}-\delta) x_C(t-\tau_{C,1}-\delta) \sin(\alpha) \qquad (21)$$

$$V = B_1 D(t-\tau_{Y,1}-\delta) x_Y(t-\tau_{Y,1}-\delta) \cos(\alpha) \qquad (22)$$

$$W = A_2 D(t-\tau_{C,2}-\delta^*) x_C(t-\tau_{C,2}-\delta^*) \cos(\gamma-\beta) \qquad (23)$$

$$X = A_2 D(t-\tau_{C,2}-\delta^*) x_C(t-\tau_{C,2}-\delta^*) \sin(\gamma-\beta) \qquad (24)$$

$$Y = B_2 D(t-\tau_{Y,2}-\delta^*) x_Y(t-\tau_{Y,2}-\delta^*) \sin(\gamma-\beta) \qquad (25)$$

$$Z = B_2 D(t-\tau_{Y,2}-\delta^*) x_Y(t-\tau_{Y,2}-\delta^*) \cos(\gamma-\beta) \qquad (26)$$

The signal of equation (19) is integrated for various values of the delay δ* and frequency offset f* to develop $$S_{\delta,\delta^*} = \int S_{Q,1,2,\delta} \cdot S_{2,\delta^*} \qquad (27)$$
$$= \int \{UW + iUX + UY - iUZ - VW - iVX - VY + iVZ\}$$

At this point it may be noted that although the signal of equation (18) shows the signal of one satellite, unit 200 actually develops a signal that includes a contribution from all visible satellites. It can be shown that each of the integration results therefore may result in a plurality of peaks, but the one that pertains to the chosen satellite is the peak with highest energy. The energy of this peak, relative to the peaks for the other satellites commonly visible to units 100 and 200, may be further enhanced through signal processing; for example, with a directional antenna or a beamsteering antenna array focused to enhance the signal of the satellite of interest.

The Doppler frequency estimate $\hat{f}_{D,1}$ is very close to $f_{D,1}$, and the expression $\hat{\theta}_1$ is very close to $\theta_1$ (as a result of the capture and tracking operations). Consequently, all terms containing the factor "U" (which includes $\sin(\alpha) \approx \alpha \approx 0$) drop out. Also, the $\cos(\alpha)$ can be replaced by 1. Likewise, it is noted that the code sequence $x_C$ is orthogonal to the code sequence $x_Y$ (meaning that following integration the sum of their product is zero). Consequently, the "VW" and "VX" terms drop out. Additionally, the "V" term, which contains the $\cos(\alpha)$ reduces to $V = B_1 D(t - \tau_{Y,1} - \delta) x_Y(t - \tau_{Y,1} - \delta)$, leaving $$S_{\delta,\delta^*} = \int \{-VY + iVZ\} = -\int VY + i\int VZ. \quad (28)$$

As indicated above, the expression of equation (27) is evaluated for different values of $\delta^*$ and $f^*$ (effectively a two-dimensional correlation), and values $\delta^*_{best}$ and $f^*_{best}$ are found that yield the maximum magnitude; i.e., $$\|S_{\delta,\delta^*}|_{max}\|^2 = \max\left(\left(\int \Psi(t, \delta^*)\cos(\alpha)\sin(\gamma - \beta)\right)^2 + \left(\int \Psi(t, \delta^*)\cos(\alpha)\cos(\gamma - \beta)\right)^2\right) \quad (29)$$

where $\Psi(t, \delta^*) = (B_1 D(t - \tau_{Y,1} - \delta))(B_2 D(t - \tau_{Y,2} - \delta^*)) x_Y(t - \tau_{Y,1} - \delta) x_Y(t - \tau_{Y,2} - \delta^*)$.

When the approximations are good; that is, $f_{D,1} \approx \hat{f}_{D,1}$ and $\theta_1 \approx \hat{\theta}_1$ then $\cos(\alpha) \approx 1$, and reinstating what $\gamma$ and $\beta$ stand for, and looking only within the brackets, we have $$\left(\left(\int \Psi(t, \delta^*) x_Y(t - \tau_{Y,1} - \delta) x_Y(t - \tau_{Y,2} - \delta^*) \sin\left(2\pi\left(\tilde{f}_{D,2} - \hat{f}_{D,2}\right) t + \Gamma\right)\right) + \left(\int \Psi(t, \delta^*) x_Y(t - \tau_{Y,1} - \delta) x_Y(t - \tau_{Y,2} - \delta^*) \cos\left(2\pi\left(\tilde{f}_{D,2} - \hat{f}_{D,2}\right) t + \Gamma\right)\right)^2\right) \quad (30)$$

where $$\Gamma = 2\pi[(f_{IF} + \tilde{f}_{D,2})\delta - (f_{IF} + \hat{f}_{D,2})\delta^*] + \theta'_2 - \hat{\theta}_2. \quad (31)$$

Under the assumption that the code and the data take on value of only +1 or −1, and because the autocorrelation of $x_Y(t)$ is close to zero at all but $t=0$, it follows that equation (29) is essentially 0 except when $(-\tau_{Y,1} - \delta) = (-\tau_{Y,2} - \delta^*)$, or $$\delta = \delta^*_{best} - \tau_{Y,1} + \tau_{Y,2}. \quad (32)$$

at which point it degenerates to $$S_{\delta,\delta^*}|_{max} = (B_1 B_2)^2 \left[\left(\int \sin\left(2\pi\left(\tilde{f}_{D,2} - \hat{f}_{D,2}\right) t + \Gamma\right)\right)^2 + \left(\int \cos\left(2\pi\left(\tilde{f}_{D,2} - \hat{f}_{D,2}\right) t + \Gamma\right)\right)^2\right] \quad (33)$$

$$= (B_1 B_2)^2 \left[\left(\int \sin(2\pi(\Delta f) t + \Gamma)\right)^2 + \left(\int \cos(2\pi(\Delta f) t + \Gamma)\right)^2\right]$$

where $\Delta f = \tilde{f}_{D,2} - \hat{f}_{D,2}$, which leads to $$\Delta f = (f_{D,2} - \hat{f}_{D,2}) + (f^*_{best} - f_{secret}) \quad (34)$$

The peak in the value of $S_{\delta,\delta^*}|_{max}$ occurs when $\Delta f$ is very small. Since the estimate $\hat{f}_{D,2}$ is very close to $f_{D,2}$, equation (34) degenerates to $f_{secret} = f^*$, and that equation (33) reduces to:

$$S_{\delta,\delta^*}|_{max} = (B_1 B_2)^2. \quad (35)$$

What we have, then, is that when the transit delay and Doppler frequency shift information derived from published tables, geometric considerations, etc. are accurate, the autocorrelation has a peak only when (a) equation (32) condition holds; i.e., $\delta_{datum} = \delta^* - \tau_{Y,1} + \tau_{Y,2}$, and (b) equation (34) condition holds; i.e., $f_{datum} = f^*$.

Since unit 200 can compute the transit delay difference $(\tau_{Y,2} - \tau_{Y,1})$ using, for example, published tables describing the satellite orbits, the $\delta_{datum}$ information injected into the signal by unit 100 is easily recovered at unit 200 (equation 32). Conversely, when unit 100 wishes unit 200 to recover a particular value $\delta^*$, unit 100 accounts for the transit delay difference and computes the $\delta_{datum}$ that it needs to send. Also, when $\delta_{datum} = 0$, equation (32) yields a value that corresponds to $(\tau_{Y,1} - \tau_{Y,2})$, and from the above-mentioned tables, unit 200 can determine the location of unit 100.

The same capability exists in connection with the frequencies, in that information can be communicated from unit 100 to unit 200 via the $f_{datum}$ value.

Going back to equation (12), it is noted that it includes a signal component that is modulated by the $x_C$ code, which is publicly known. The chip rate of the $x_C$ code has a bandwidth of about 2 MHz. (2 MHz main lobe).

Based on this observation, an alternative embodiment in accord with the principles disclosed herein passes the signal of equation (12) through a bandstop filter that is adjusted to remove the publicly known $x_C$ code-modulated component (alternatively one can pass the signal of equations (13) or (14) through the bandstop filter). Passing the signal though the such a filter alters the equation (15) signal to $$s_{Q,1,2,\delta} = -2[B_1 D(t - \tau_{Y,1} - \delta) x_Y(t - \tau_{Y,1} - \delta) \cos(\alpha)][\cos(\beta) - i \sin(\beta)] \quad (36)$$

but that does NOT change equation (28). The difference, of course, is that the embodiment that includes the bandstop filter does not send a signal that includes a knowable signal component that perhaps might be used by an adversary, and yet accomplishes the same result as an embodiment that does not use the bandstop filter.

In yet another embodiment in accord with the principles disclosed herein, the signal that is processed by unit 100 and sent to unit 200 can be the signal of just a selected subset of the visible satellites; perhaps just one of the satellites. Illustratively, this is accomplished by having the input antenna of unit 100 be steerable, though other more complicated techniques that would work as well. Any of the known designs or techniques for creating a steerable antenna is acceptable.

There are also other techniques that may be used which work as well. This method reduces the number of peaks that are achievable at an adversary unit, as well as at unit 200, and further it obscures the satellite signal which was used for the delay-based and/or frequency-based encoding, making reverse-engineering of the values of $\delta_{datum}$ and/or $f_{datum}$ substantially harder (or impracticable) for an adversary.

The above embodiments do not specify the duration of the signal that unit 100 sends to unit 200. A short duration results in a smaller correlation peak. A smaller peak is more difficult to detect in the presence of peaks that result from spurious signals (noise). It is, therefore, useful to limit the duration of the signal that unit 100 sends.

The above discloses the notion that two pieces of information can be send by unit 100 to unit 200, in a secure manner, with each transmission of a signal segment: one embedded in $\delta_{datum}$ and the other embedded in $f_{datum}$. Data can be communicated continuously, of course, by sending $\{\delta_{datum}, f_{datum}\}$-tuples in successive frames.

It may be noted that although the above discloses the principles of this invention in connection with GPS signals, that is not a limitation of this invention. Alternate sources that can create signal like the Y code include device that operate in a WiFi protocol, Blue tooth protocol, cellular telephony protocols, etc.

It may be further noted that the illustrative embodiment disclosed above is adapted to a situation where the location of unit 100 is known to unit 200.

The invention claimed is:

1. A method executed by a first unit having a first antenna located at a first location, which antenna is constructed to receive a signal comprising a sum of constituent signal, each from a different source of a plurality of sources, and each of the constituent signals containing a component that is modulated by a known code and a component that is modulated by a code that is not publicly known and not known to said method (secret code), for communicating a data signal of said first unit to a second unit having a second antenna at a second location that is known to said method, which is associated with a second unit, comprising the steps of:
   processing said signal to remove a Doppler frequency shift that said signal experiences in arriving at said first antenna, thereby creating a signal A;
   processing signal A with said data signal expressed through time delay, frequency shift, or both, to form signal A';
   creating a signal B that corresponds to a signal that is expected to have been received at said second antenna in response to a signal transmitted by a particular one of said sources, and processing said signal B with said data signal expressed through time delay, frequency shift, or both, to form signal B';
   creating a signal C that is a function of signal A' multiplied by signal B'; and
   sending signal C to said second unit.

2. The method of claim 1 where said sources are satellites, and signal B' corresponds to $\cos(\beta) - i\sin(\beta)$, where $\beta = 2\pi(f_{IF} + \hat{f}_{D,2})(\tilde{t}) + \hat{\theta}_2$, $f_{IF}$ an intermediate frequency that said second unit employs in downshifting the signal received by said second antenna, $\hat{f}_{D,2} = \hat{f}_{D,2} + f_{datum}$ when said input data is expressed through said frequency shift, $\tilde{t} = t - \delta_{datum}$ when said input data is expressed through said time delay, $\hat{f}_{D,2}$ is an estimate of a Doppler frequency shift experienced by a signal, received by said second antenna, arriving from said particular satellite, and $\hat{\theta}_2$ is an offset phase shift estimate.

3. The method of claim 1, where bandwidth of the components that are modulated by said known code is lower than bandwidth of the components that are modulated by said secret code, further comprising the step of passing signal C through a bandstop filter prior to sending the signal to said second unit to remove the components that are modulated by said known code.

4. The method of claim 1 where said sources are satellites and said first antenna is constructed to receive primarily the signal of said particular satellite.

5. The method of claim 1 where said data signal comprises frames and at least some of the frames carry different data.

6. The method of claim 1 where said sources are satellites, and each of the satellites outputs a signal corresponding to $$S_{sent}^k = A_1^k D^k(t) x_C^k(t) \cos(2\pi(f_{L1})t + \phi_1^k) + B_1^k D^k(t) x_Y^k(t) \sin(2\pi(f_{L1})t + \phi_1^k)$$

and signal A corresponds to $S_{sent}^k$ is $$S_{downshifted,1}^k = A_1^k D^k(t - \tau_{C,1}^k) x_C(t - \tau_{C,1}^k) \cos(2\pi(f_{D,1}^k - \hat{f}_{D,1}^k)t + \theta_1^k - \hat{\theta}_1^k) + B_1^k D^k(t - \tau_{Y,1}^k) x_Y(t - \tau_{Y,1}^k) \sin(2\pi(f_{D,1}^k - \hat{f}_{D,1}^k)t + \theta_1^k - \hat{\theta}_1^k),$$

where
   superscript k designates a particular one of said sources,
   $\sin(2\pi(f_{L1})t + \phi_1)$ is a carrier signal at frequency $f_{L1}$ and phase $\phi_1$,
   $f_{IF}$ is an intermediate frequency that is lower than $f_{L1}$,
   $f_{D,1}^k$ is Doppler frequency shift experienced by said $S_{sent}^k$ signal in reaching said unit,
   $\hat{f}_{D,1}^k$ is an estimate of $f_{D,1}^k$,
   $x_Y^k$ is an unknown pseudorandom signal that is not publicly known,
   $B_1^k$ is an amplitude measure of said $\sin(2\pi(f_{L1})t + \phi_1)$ signal,
   $\cos(2\pi(f_{L1})t + \phi_1)$ is a carrier signal that is orthogonal to $\sin(2\pi(f_{L1})t + \phi_1)$,
   $x_C^k$ is a known pseudorandom signal,
   $A_1^k$ is an amplitude measure of said $\cos(2\pi(f_{L1})t + \phi_1)$ signal.
   $D^k$ is a digital data signal that modulates said $x_Y^k$ pseudorandom signal and also said $x_C^k$ pseudorandom signal,
   $\tau_{Y,1}^k$ is related to transit time delay of the modulated $x_Y^k$ pseudorandom signal,
   $\tau_{C,1}^k$ is related to transit time delay of the modulated $x_C^k$ pseudorandom signal,
   $\theta_1^k$ is a phase that is related to said phase $\phi_1$, and to said transit time delay, and
   $\hat{\theta}_1^k$ is an estimate of $\theta_1^k$.

7. The method of claim 6 where signal B corresponds to $$\cos[2\pi(f_{IF} + \hat{f}_{D,2}^j)t + \hat{\theta}_2^j] - i\sin[2\pi(f_{IF} + \hat{f}_{D,2}^j)t + \hat{\theta}_2^j]$$

where $\hat{f}_{D,2}^j = \hat{f}_{D,2}^j + f_{datum}$, $\hat{f}_{D,2}^j$ is an estimate of a Doppler frequency shift experienced by the signal sent by said selected one of said sources, designated by superscript j, in reaching said second antenna; $\hat{\theta}_2^j$ is an estimate of a phase shift that that is related to a phase shift of a signal from said selected one of said sources when processed in said second unit; and $f_{datum}$ is a data signal sought to be communicated by said unit.

8. The method of claim 7 where signal C is related to $$A_1^k D^k(t - \tau_{C,1}^k - \delta_{datum}) x_C(t - \tau_{C,1}^k - \delta_{datum}) \cos(2\pi(f_{D,1}^k - \hat{f}_{D,1}^k)(t - \delta_{datum}) + \theta_1^k - \hat{\theta}_1^k) + B_1^k D^k(t - \tau_{Y,1}^k - \delta_{datum}) x_Y(t - \tau_{Y,1}^k - \delta_{datum}) \sin(2\pi(f_{D,1}^k - \hat{f}_{D,1}^k)(t - \delta_{datum}) + \theta_1^k - \hat{\theta}_1^k)$$

multiplied by $$\cos[2\pi(f_{IF} + \hat{f}_{D,2})(t - \delta_{datum}) + \hat{\theta}_2] - i\sin[2\pi(f_{IF} + \hat{f}_{D,2})(t - \delta_{datum}) + \hat{\theta}_2]$$

and $\delta_{datum}$ is another data signal sought to be communicated by said unit.

9. A method executed by a unit having an antenna located at a second location, which antenna is constructed to receive a signal from each of one or more sources, comprising the steps of:

creating a signal D that is developed from signals received by said antenna, which includes a signal of a preselected one of said sources, and the signal from said preselected one of said sources includes a component that is not publicly known and not known to said method;

receiving a signal E from another unit having an antenna at a first location for receiving signals from said one or more sources;

integrating a signal related to a product of signals D and E and to a signal F for a preselected duration to obtain an integration result signal; and repeating the step of integrating, with different values of said signal F, to identify a particular signal F that yields a maximum value for said integration result signal.

10. The method of claim 9 where said signal F has a first data component and a second data component.

11. The method of claim 9 where said signal related to a product of signals D and E is either signal D multiplied by signal E that is modified by signal F, or signal E multiplied by signal D that is modified by signal F.

* * * * *